No. 12,138. REISSUED JULY 28, 1903.

A. DE VILBISS, JR.

SCALE.

APPLICATION FILED MAR. 13, 1902.

Witnesses:
Reginald G. Pratt
Louis B. Erwin

Inventor:
Allen De Vilbiss Jr
By Rector & Hibben
His Attys

No. 12,138. Reissued July 28, 1903.

UNITED STATES PATENT OFFICE.

ALLEN DE VILBISS, JR., OF TOLEDO, OHIO, ASSIGNOR, BY MESNE ASSIGNMENTS, TO TOLEDO SCALE AND CASH REGISTER COMPANY, OF NEWARK, NEW JERSEY, A CORPORATION OF NEW JERSEY.

SCALE.

SPECIFICATION forming part of Reissued Letters Patent No. 12,138, dated July 28, 1903.

Original No. 674,646, dated May 21, 1901. Application for reissue filed March 13, 1902. Serial No. 98,111.

*To all whom it may concern:*

Be it known that I, ALLEN DE VILBISS, Jr., a citizen of the United States, residing at Toledo, in the county of Lucas and State of Ohio, have invented certain new and useful Improvements in Scales, of which the following is a description, reference being had to the accompanying drawings, forming part of this specification.

My invention relates to what are commonly known as "computing" or "price" scales, being scales which indicate not only the weight of the article or commodity being weighed, but also its value at any given price per pound (or other unit of weight) within the capacity of the scale and has for its object certain improvements in scales of this character which will be hereinafter explained, and pointed out in the claims.

Figure 1:
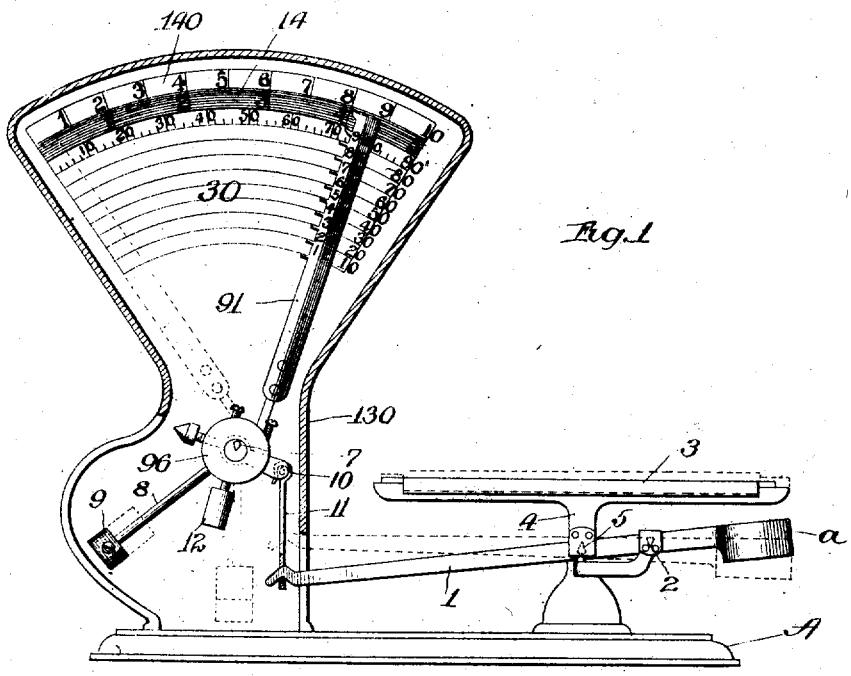
Figure 2:
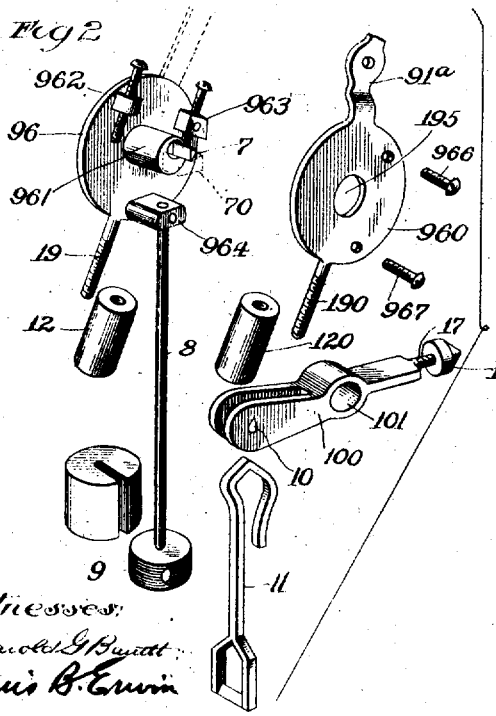
Figure 3:
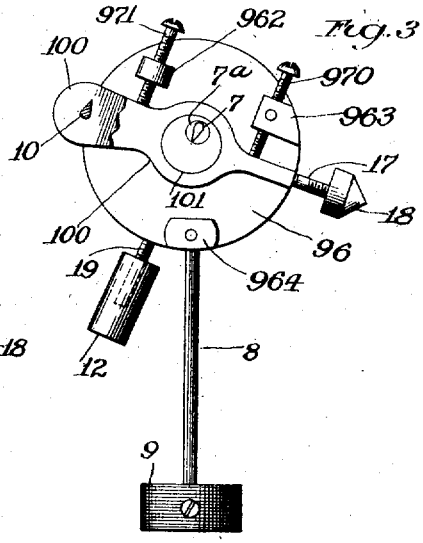

In the accompanying drawings, Figure 1 is a front elevation of the scale with the casing thereof in section to expose the parts within it. Fig. 2 is a perspective view of a group of unassembled parts, comprising the central disk, the pendulum, and the link-carrier and link, looking at the rear side of said parts; and Fig. 3, a rear elevation of some of said parts assembled together.

The same characters of reference are used to indicate identical parts in the several views.

The main scale-beam 1 is fulcrumed at 2 upon supports rising from the scale-base A and has mounted upon it the weighing pan or platform 3, which is provided on its under side with a standard 4, pivotally supported upon the beam at 5, as usual. Mounted upon the opposite or left-hand end of the scale-base A is a case or housing 130, whose upper portion is open at its front side to expose to view the computing-table 30, mounted within the housing.

Moving over and coöperating with the table 30 is an index-hand 91, pivotally supported at its lower end and having rigidly connected with it a weighted pendulum 8 9, which tends to hold the index-hand in its normal or zero position at the left-hand end of the computing-table 30, as indicated by the dotted lines in Fig. 1. The index-hand and pendulum are connected with the inner or left-hand end of the scale-beam 1, and whenever a load is placed upon the platform 3 the pendulum is swung to the left from vertical position and the index-hand to the right from normal position until such load is counterbalanced by the weight and leverage of the pendulum, whereupon the index-hand 91 comes to rest at a point upon the computing-table 30, indicating the weight and value of the article upon the scale-platform. To this end the index-hand 91 is provided with a series of numbers representing different prices per pound, and the computing-table 30 is graduated and numbered to indicate different totals of value at said several prices per pound. In the present instance the index-hand is provided with two series of rows of price units, of contrasting color or located upon surfaces of contrasting color, and the computing-table 30 is provided at its upper end with two rows of weight-numbers 140 and 14 of contrasting color, corresponding to the two rows of price-numbers upon the index-hand, and there is also provided a supplemental weight 90 for the pendulum 8; but these are features of my scale covered by patents heretofore granted me and which form no part of my present invention.

As thus far generally described, my present scale is substantially the same as those heretofore patented to me, and I will now proceed to describe the improvements constituting my present invention. The central pivot for the index-hand 91 and pendulum 8 consists of knife-edges 7, projecting from the opposite ends of a hub 961 and resting in bearings 70 upon the inner surfaces of the front and rear walls of the housing 130, as indicated in Fig. 2. The hub 961 projects from the center of a disk 96, which disk is also provided upon its inner face with two lugs 963 and 964, which afford means for attachment of a second disk 960, which is provided with a central hole 965, adapted to fit over the end of the hub 961 opposite the disk 960 and to be secured to the lugs 963 and 964 by screws 966 and 967, passed through holes in the disk 960 and entering said lugs. The disk 960 is provided with a projecting arm 91[a] to which is secured the index-hand 91, and at its side opposite said arm it is provided with a projecting threaded rod 190 to receive a counterbalancing-weight 120 for the index-hand. The disk 96 is also provided with a similar screw-rod 19 and nut 12, screwed thereon to aid the nut 120 in counterbalancing the index-hand. In the present instance the knife-edges 7, projecting from the opposite ends of the hub 961, are formed upon the ends of a round bar or rod 7ª, Fig. 3, driven tightly into and extending entirely through the hub 961, its location being such that the active edges of the knife-edges 7 are coincident with the central axis of the hub 961. The pendulum 8 is secured at its upper end in the lug 964 and depends rigidly therefrom.

The link-carrier for the link which connects the inner end of the main scale-beam 1 with the index-hand and pendulum consists in the present instance of a lever 100, provided near its middle with a circular hole or eye 101, fitting the exterior of the hub 961, so that the lever may rock upon said hub as a fulcrum. The lever is engaged at opposite sides of its fulcrum by set-screws 970 and 971, the former of which is threaded through and carried by the lug 963 and the latter by a second lug 962. By retracting one of these screws and advancing the other the lever may be rocked upon its fulcrum and adjusted, as desired, for the purpose hereinafter explained. One end of the lever is bifurcated and carries a knife-edge 10, over which is hooked the upper end of the link 11, whose lower end is provided with a loop through which passes the inner end of the scale-beam 1. The opposite end of the lever is formed into a threaded rod 17 to receive a weighted nut 18 for counterbalancing the opposite end of the lever and the weight of the link 11.

In assembling the parts of a scale of this character it has been found difficult to properly counterbalance the weight of the index-hand and the weight of the link connecting the link-carrier with the scale-beam, because the adjustment of the counterbalancing-weight of one of these parts tends to destroy the counterbalance of the other, and I therefore adjust their counterbalances separately, as described below. Furthermore, after the index-hand and link-carrier have been properly counterbalanced, so that the hand stands accurately at the zero-line when the pendulum hangs vertical, it is often found on testing the scale that the hand does not accurately register with all of the graduations upon the computing-table. This is due to the fact that the extremes of movement of the link-pivot 10 are not in proper relation to a horizontal line drawn through the active edge of the main pivot 7. This link-pivot 10 normally stands above such horizontal line, and it is manifest that as it is drawn downward toward said line the leverage of the link-carrier will increase as the link-pivot, moving in the arc of a circle, approaches said line and that said leverage will gradually decrease as the link-pivot moves on downward in the arc of a circle away from said line. If the construction and adjustment of the parts are such, therefore, that the index-hand is to stand at middle position upon the computing-table when the position of the link-pivot coincides with a horizontal line through the active edge of the main pivot 7, it follows that the position of the link-pivot must be so adjusted that its extremes of movement will be equidistant from said horizontal line. If its path of movement is too high relatively to said line, the initial leverage of the link-carrier will be too small and its resistance to the pull of the link under the weight of the load upon the scale-platform be too great, while its leverage during the latter part of its full movement will be too great and its resistance to the pull of the link upon it insufficient. On the other hand, if the path of movement of the link-pivot is too low relatively to the horizontal line the initial leverage of the link-carrier will be too great and its resistance to the pull of the link insufficient, while its final leverage will be too small and its resistance to the pull of the link too great. The provision of the adjustable link-carrier described above enables me to readily adjust the position of the link-pivot so that its extremes of movement will be exactly equidistant from the horizontal line through the active edge of the main pivot, and this without destroying or affecting the counterbalance of either the index-hand or the link.

To this end the mode of operation of assembling the parts is as follows: The index-hand 91 having been previously secured to the arm 91ª of the disk 960 and the pendulum 8 to the lug 964 of the disk 96 and the counterbalance-weights 12 and 120 applied to the screw-rods 19 and 190, the disk 960 is secured to the disk 96 by the screws 966 and 967, passing through the holes in the disk 960 and entering the lugs 963 and 964 on the disk 96, the end of the hub 961 passing through the central hole 965 on the disk 960, with its knife-edge 7 projecting beyond said disk in a position corresponding to the other knife-edge 7, projecting from the farther side of the disk 96. These connected parts are then inserted in the casing with the knife-edges 7 resting in the bearings 70 thereon. The nuts 12 and 120 are then adjusted until the index-hand 91 is perfectly counterbalanced and stands at the zero-line upon the computing-table when the pendulum hangs vertical and whether the removable weight 90 is used or not. The parts are then removed from the casing, the disk 960 disconnected from the disk 96, the link-carrier 100 slipped over the hub 961, the screws 970 and 971 tightened upon it, the disk 960 reattached, and the parts again inserted in the casing. The link 11 is then hung upon the link-pivot to connect the latter with the scale-beam 1, after which the nut 18 is adjusted on the screw 17 to counterbalance the link and bring the index-hand back to the zero-line upon the computing-table, so that it will stand accurately over said line when the pendulum hangs vertical and whether the removable weight 90 is used or not. The scale is now ready to be tested to ascertain if the active edge of the index-hand properly registers with all of the lines or graduations on the computing-table, and this test is made by placing in succession a series of known weights upon the scale-platform and noting the positions to which they severally move the index-hand. If the initial movement of the index-hand—*i. e.*, its movement over the first or left-hand half of the computing-table—is excessive, it indicates that the normal position of the link-pivot 10 is too low, giving too great initial leverage to the link-carrier, while if the initial movement of the index-hand is not sufficient it indicates that the normal position of the link-pivot is too high, giving the link-carrier insufficient leverage during such initial movement. Excessive initial movement of the index-hand will be accompanied by deficient final movement—*i. e.*, over the second or right-hand half of the computing-table—while deficient initial movement will be accompanied by excessive final movement. To correct these inaccuracies, the link-carrier 100 is adjusted about the hub 961 to raise or lower the normal position of the link-pivot, the set-screw 970 being retracted and the screw 971 advanced to raise it and the screw 971 retracted and the screw 970 advanced to lower it, and by this adjustment of the position of the link-pivot 10 the index-hand may be caused to accurately register with all of the graduations upon the computing-table, and this adjustment is effected without in any manner affecting the previous counterbalance of the index-hand and the link by means of the nuts 12 and 120 and the nut 18, respectively.

The scale-beam and weighing platform or pan are counterbalanced independently of the mechanism within the casing by the weight *a* upon the outer end of said beam.

It is obvious that considerable change may be made in the details of construction above described without departing from my invention. Thus other means than the nuts 12 and 120 may be employed for counterbalancing the index-hand, or one of said nuts may be employed without the other. The link-carrier 100 may be adjusted around the hub 961 or about its pivotal support by other means than the set-screws 970 and 971, and the disk 960 may be entirely dispensed with and the index-hand be secured to the disk 96, as indicated by the dotted lines in Fig. 2, in which latter case the parts shown in Fig. 3 could be employed as there shown without the disk 960 and the parts carried by it.

Having thus described my invention, I claim—

1. In a scale, the combination, with the computing-table and the scale-beam, of a central hub having knife-edges projecting from its opposite ends and resting in supporting-bearings, an index-hand and pendulum connected to said hub, a link-carrier mounted upon said hub and adjustable around the same, and a link connecting said carrier with the scale-beam; substantially as described.

2. In a scale, the combination, with the computing-table and the scale-beam, of a central hub having knife-edges projecting from its opposite ends and resting in supporting-bearings, an index-hand and pendulum connected to said hub, a link-carrier mounted upon said hub and adjustable around the same, a link connecting said carrier with the scale-beam, means carried by the hub for counterbalancing the weight of the index-hand, and means upon the link-carrier for counterbalancing the weight of the link; substantially as described.

3. In a scale, the combination, with the computing-table and the scale-beam, of a central hub having knife-edges projecting from its opposite ends and resting in supporting-bearings, an index-hand and pendulum connected to said hub, a link-carrier in the form of a lever mounted upon said hub and adjustable around the same, and carrying a link-pivot at one end and a counterbalancing-weight at its opposite end, and a link connecting said link-pivot with the scale-beam; substantially as described.

4. In a scale, the combination, with the computing-table and the scale-beam, of a central hub supported in suitable bearings, a disk carried by said hub, an index-hand carried by the disk and coöperating with the computing-table, a pendulum depending rigidly from the disk, a link-carrier mounted upon the hub and adjustable around the same, and a link connecting said carrier with the scale-beam; substantially as described.

5. In a scale, the combination with the computing-table and the scale-beam, of a central hub supported in suitable bearings, a disk carried by said hub, an index-hand carried by the disk and coöperating with the computing-table, a pendulum depending rigidly from the disk, a link-carrier in the form of a lever mounted upon said hub and adjustable around the same, a pair of adjusting-screws carried by the disk and engaging the link-carrier upon opposite sides of the hub, and a link connecting the link-carrier with the scale-beam; substantially as described.

6. In a scale, the combination, with the computing-table and the scale-beam, of a central hub supported in suitable bearings, a disk carried by said hub, an index-hand carried by the disk and coöperating with the computing-table, a pendulum depending rigidly from the disk, a link-carrier mounted upon the hub and adjustable around the same, a link connecting said carrier with the scale-beam, means on the disk for counterbalancing the weight of the index-hand, and means on the link-carrier for counterbalancing the weight of the link; substantially as described.

7. In a scale, the combination, with the computing-table and scale-beam, of a central hub supported in suitable bearings, a disk carried by said hub, an index-hand carried by the disk and coöperating with the computing-table, a pendulum depending rigidly from the disk, a link-carrier in the form of a lever mounted upon said hub and adjustable around the same, and carrying a link-pivot at one end and a counterbalancing-weight at its opposite end, a pair of adjusting-screws carried by the disk and engaging the link-carrier upon opposite sides of the hub, a link connecting the link-carrier with the scale-beam; substantially as described.

8. In a scale, the combination, with the computing-table and the scale-beam, of a central hub supported in suitable bearings, an index-hand and pendulum rigidly connected with said hub, a link-pivot carried by said hub and adjustable concentrically thereto and relatively to the pendulum, and a link connecting said link-pivot with the scale-beam; substantially as described.

9. In a scale, the combination, with the computing-table and the scale-beam, of an oscillatory disk supported in suitable bearings, an index-hand carried by the disk and coöperating with the computing-table, a pendulum depending rigidly from the disk, a link-pivot moving with the disk and adjustable concentrically with its axis and relative to the pendulum, and a link connecting said link-pivot with the scale-beam; substantially as described.

10. In a scale, the combination, with the computing-table and the scale-beam, of a central hub supported in suitable bearings, a pair of disks mounted upon said hub at its opposite ends and turning therewith, an index-hand carried by one of the disks and coöperating with the computing-table, a pendulum depending rigidly from the disks, a link-carrier mounted upon the hub between the disks and adjustable around the hub, and a link connecting said link-carrier with the scale-beam; substantially as described.

11. In a scale, the combination, with the computing-table and the scale-beam, of a central hub supported in suitable bearings, a pair of disks mounted upon said hub at its opposite ends and turning therewith, an index-hand carried by one of the disks and coöperating with the computing-table, a pendulum depending rigidly from the disks, a link-carrier in the form of a lever mounted upon and adjustable around the hub between said disks, a pair of screws carried by one of the disks and engaging the link-carrier upon opposite sides of the hub, and a link connecting the link-carrier with the scale-beam; substantially as described.

12. In a scale, the combination, with the computing-table and the scale-beam, of a central hub supported in suitable bearings, a pair of disks mounted upon said hub at its opposite ends and turning therewith, an index-hand carried by one of the disks and coöperating with the computing-table, a pendulum depending rigidly from the disks, a link-carrier in the form of a lever mounted upon and adjustable around the hub between said disks, and carrying a link-pivot at one end and a counterbalancing-weight at its opposite end, and a link connecting said link-pivot with the scale-beam, substantially as described.

13. In a scale, the combination with the computing-table and the scale-beam, of a central hub supported in suitable bearings, a disk permanently secured to said hub at one end thereof, a removable disk fitting over the opposite end of the hub, means for securing the two disks together, an index-hand carried by one of the disks and coöperating with the computing-table, a pendulum depending rigidly from the disks, a link-carrier mounted upon and adjustable around the hub between said disks, and a link connecting the link-carrier with the scale-beam; substantially as described.

14. In a scale, the combination with the computing-table and the scale-beam, of a central hub supported in suitable bearings, a disk permanently secured to said hub at one end thereof, a removable disk fitting over the opposite end of the hub, inwardly-projecting lugs on one of said disks and screws passing through the other and entering said lugs, to secure the disks together, an index-hand carried by the disks and coöperating with the computing-table, a pendulum rigidly depending from the disks, a link-carrier mounted upon and adjustable around the hub between said disks, and a link connecting the link-carrier with the scale-beam; substantially as described.

15. In a scale, the combination, with the computing-table and the scale-beam, of a central hub, a round rod driven tightly into and extending through said hub and having its opposite ends projecting therefrom and formed into knife-edges, said knife-edges being coincident with the axis of the hub and resting in suitable supporting-bearings, an index-hand and pendulum rigidly connected with the hub, and a connection between the hub and scale-beam; substantially as described.

16. In a scale, the combination, with a table and a scale-beam, of an index coöperating with said table and a pendulum moving with said index, a link-carrier connected with said index and pendulum, means for adjusting said link-carrier concentrically with the pivotal support of the index and pendulum and relatively to the pendulum, and a link connecting said carrier with the scale-beam; substantially as described.

ALLEN DE VILBISS, JR.

Witnesses:
J. S. B. RICHARDSON,
W. G. SENSEMAN.